United States Patent [19]

Fraignier et al.

[11] Patent Number: 4,967,092
[45] Date of Patent: Oct. 30, 1990

[54] APPARATUS FOR OPTICALLY CHECKING THE INNER PROFILE OF A TUBE OR BORE

[75] Inventors: Bernard Fraignier, Villemonble; Christian Roger, Bois Colombes, both of France

[73] Assignee: Societe Anonyme Dite Hispano-Suiza, Saint-Cloud, France

[21] Appl. No.: 352,997

[22] Filed: May 17, 1989

[30] Foreign Application Priority Data

May 17, 1988 [FR] France ............... 88 06588

[51] Int. Cl.⁵ ........................... G01N 21/86
[52] U.S. Cl. ................... 250/560; 356/241
[58] Field of Search ........... 250/560, 561; 356/241, 356/376

[56] References Cited

U.S. PATENT DOCUMENTS

| | | | |
|---|---|---|---|
| 3,602,596 | 8/1971 | Astheimer | 356/51 |
| 3,637,314 | 1/1972 | Groot | 356/241 |
| 4,199,258 | 4/1980 | Dau | 356/241 |
| 4,305,661 | 12/1981 | Pryor | 356/241 |
| 4,440,496 | 4/1984 | Milana | 356/241 |
| 4,465,374 | 8/1984 | Pryor | 356/241 |
| 4,861,984 | 8/1989 | West | 356/241 |

FOREIGN PATENT DOCUMENTS

| | | |
|---|---|---|
| 0267705 | 5/1988 | European Pat. Off. . |
| 2065549 | 7/1971 | France . |
| 2139682 | 1/1973 | France . |
| 2195337 | 3/1974 | France . |
| 2301837 | 9/1976 | France . |
| 2320542 | 3/1977 | France . |
| 2513753 | 4/1983 | France . |
| 2553877 | 4/1985 | France . |
| 2047882 | 12/1980 | United Kingdom . |

Primary Examiner—David C. Nelms
Assistant Examiner—Sherrie Hsia
Attorney, Agent, or Firm—Oblon, Spivak, McClelland, Maier & Neustadt

[57] ABSTRACT

An apparatus is provided for optically checking the inner profile of a tube or a bore, especially the tubes of steam generators in nuclear power stations, the apparatus includes a probe which is positioned within and is movable longitudinally within the tube or bore and is connected to an external power supply and analysis system. The probe includes a source of light, a mechanism for causing the light to illuminate the wall of the tube or bore along a line corresponding to the intersection of the wall with a cross-sectional plane, and a mechanism for forming an image of this line on a photosensitive sensor, so that variations in the inner profile of the tube or bore can be determined from deviations of the image from a theoretical image corresponding to the typical profile of the tube or bore.

11 Claims, 5 Drawing Sheets

FIG: 2

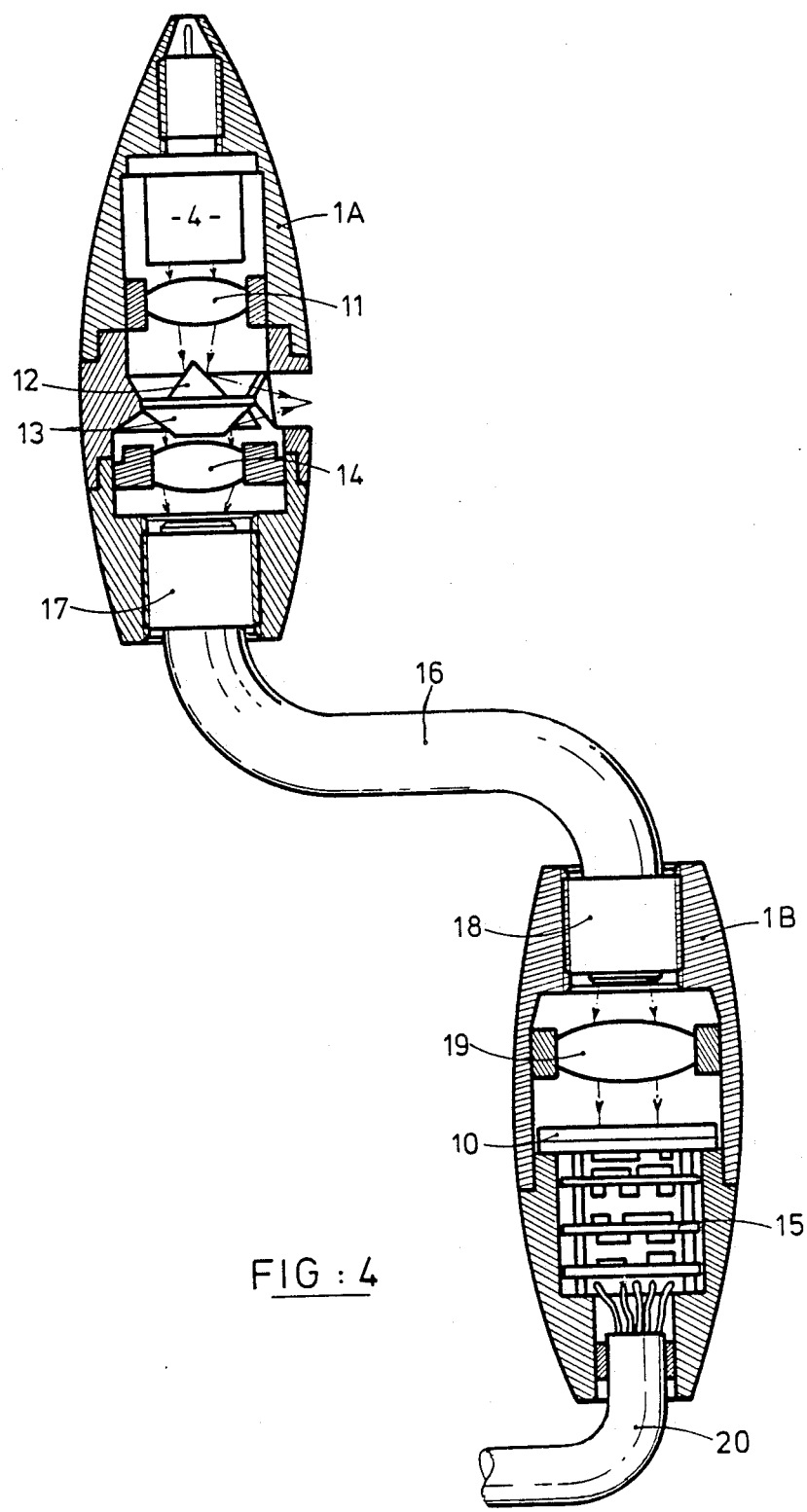

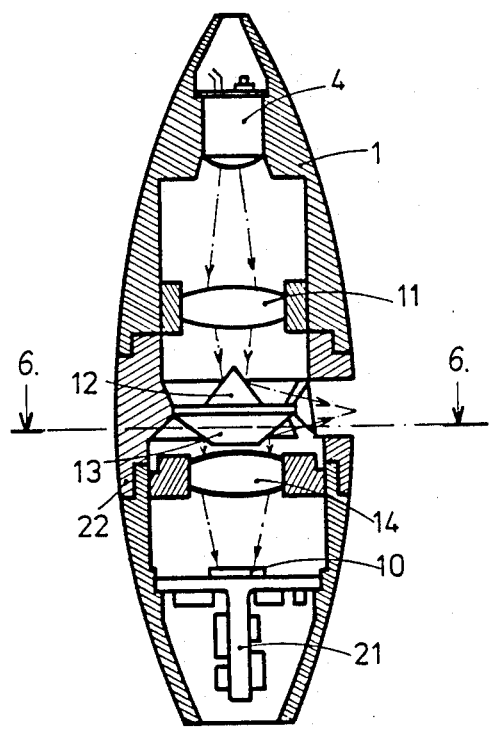
FIG : 5
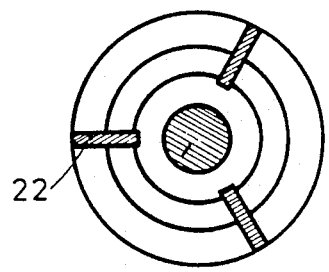
FIG : 6

APPARATUS FOR OPTICALLY CHECKING THE INNER PROFILE OF A TUBE OR BORE

BACKGROUND OF THE INVENTION

1. Field of the invention

The invention relates to apparatus for optically checking the profile of the inner wall of a tube or bore.

The apparatus is particularly suitable for the in situ inspection of the tubes of steam generators in nuclear power stations, which must be inspected regularly to detect any defects which may lead to them cracking under stress, but may be used for the inspection of any tubes or bores of great length and small diameter, whether straight or having bends.

2. Summary of the prior art

The inspection of such tubes may be carried out by a technique which makes use of Foucault currents for the detection of defects in the tube walls. This method is described in French Pat. No. 2 320 542. It may also be carried out by measuring the internal profile of the tube, and the present invention falls within this latter category.

One known technique of determining the internal profile of a tube involves using a multi-fingered probe for the simultaneous measurement of the internal radius of the tube at various positions around the circumference, when the probe is pulled along the tube, by detecting the deflection of strain gauges mounted on the fingers. Such a device is described, for example, in French Pat. No. 2 553 877.

Another known technique, described for example in French Pat. No. 2 513 753, makes use of a profile probe having a motor driven rotary head rotating about a longitudinal axis of the probe. A measuring element carried by the head makes contact with the inner surface of the tube wall.

These known devices are restricted in their field of use by the contact required between the measuring element and the inner wall, as well as by the associated mechanical devices making their miniaturization difficult, or even impossible, sufficient for them to be used in the curved areas of steam generator tubes.

SUMMARY OF THE INVENTION

The present invention serves to overcome these drawbacks by proposing an optical device for checking the inner profile of a cavity of revolution, wherein the various mechanical and opto-electronic components permit substantial miniaturization of the device.

According to the invention there is provided an apparatus for optically checking the profile of the inner wall of a tube or bore comprising a probe adapted to be positioned within and movable longitudinally within said tube or bore and connectable to a power and analysis system disposed outside said tube or bore, said probe including a light source, projecting means for causing light from said light source to illuminate said inner wall of said tube or bore along a line corresponding to the intersection of said inner wall with a cross-sectional plane, a photo-sensitive sensor, and imaging means for receiving light re-emitted from said illuminated line on said inner wall and forming an image of said line on said photo-sensitive sensor, whereby the deviations of said image on said sensor from a predetermined theoretical image of said inner wall represent variations in the profile of said inner wall.

The photo-sensitive sensor is preferably an optoelectronic sensor, but it is also possible for the sensor to comprise a photo-sensitive surface of photographic film type.

The light from the light source is preferably coherent, and may be arranged to illuminate the desired line on the inner wall of the tube or bore by using a rotating mirror to cause the light to scan said line, or by using a conical mirror arranged to reflect the light so as to illuminate the whole of the line at the same time.

When the wall is illuminated by scanning it using a rotating mirror, the imaging means for receiving light re-emitted by the inner wall of the tube or bore may comprise a second rotating mirror for reflecting the light to the photo-sensitive sensor, the second mirror being rotated synchronously with the first, i.e. that of the projecting means. In this case, if an optoelectronic sensor is used the latter may be a linear sensor which is arranged to rotate synchronously with the rotating mirrors.

Alternatively, irrespective of the method used for illuminating the wall of the tube or bore, the imaging means for directing the light from the wall to the photo-sensitive sensor may comprise a wide angle optical lens.

In another possible embodiment, the imaging means may comprise a conical mirror for reflecting light re-emitted by the wall of the tube or bore to the photosensitive sensor.

Further features of the invention will become apparent from the following non-limitative description of a number of preferred embodiments given by way of example and with reference to the accompanying drawings.

A more complete appreciation of the invention and many of the attendant advantages thereof will be readily obtained as the same becomes better understood by reference to the following detailed description when considered in connection with the accompanying drawings, wherein:

BRIEF DESCRIPTION OF THE DRAWINGS

FIG. 4 shows diagrammatically the construction of the probe of a fourth embodiment in which the probe is made in two parts.

FIG. 5 shows diagrammatically the construction of a one piece probe which operates in a manner similar to that of the embodiment shown in FIG. 3.

FIG. 6 is a cross-section taken on the line VI—VI in FIG. 5.

DESCRIPTION OF THE PREFERRED EMBODIMENTS

Figure 1:
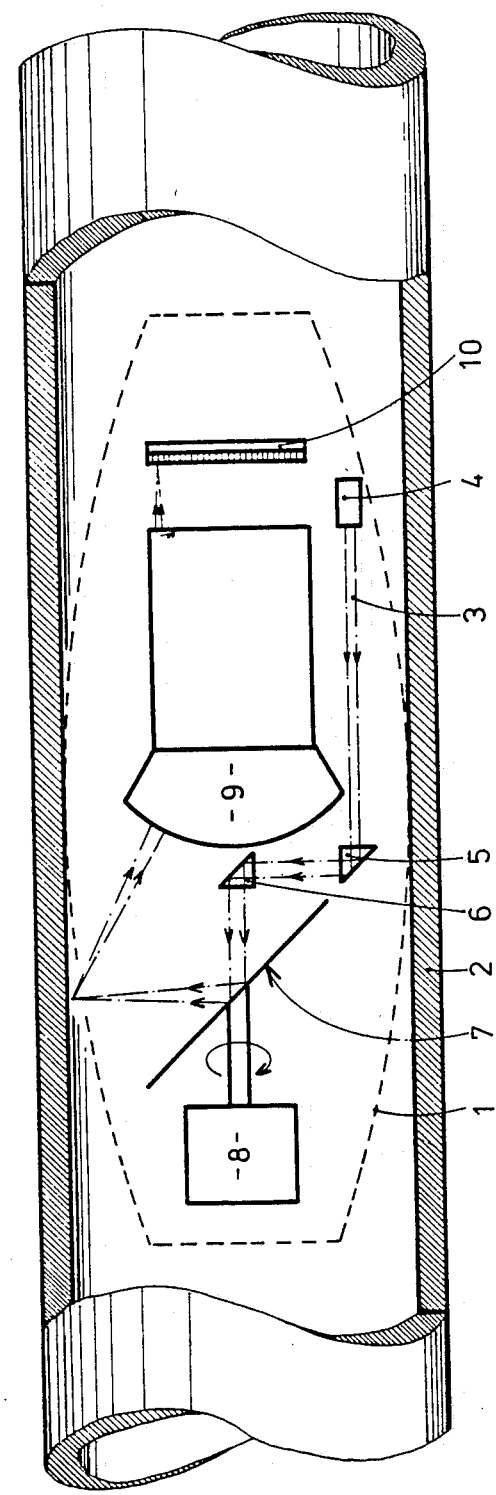
FIG. 1 shows diagrammatically the operating principles of the probe of a first embodiment.
Figure 2:
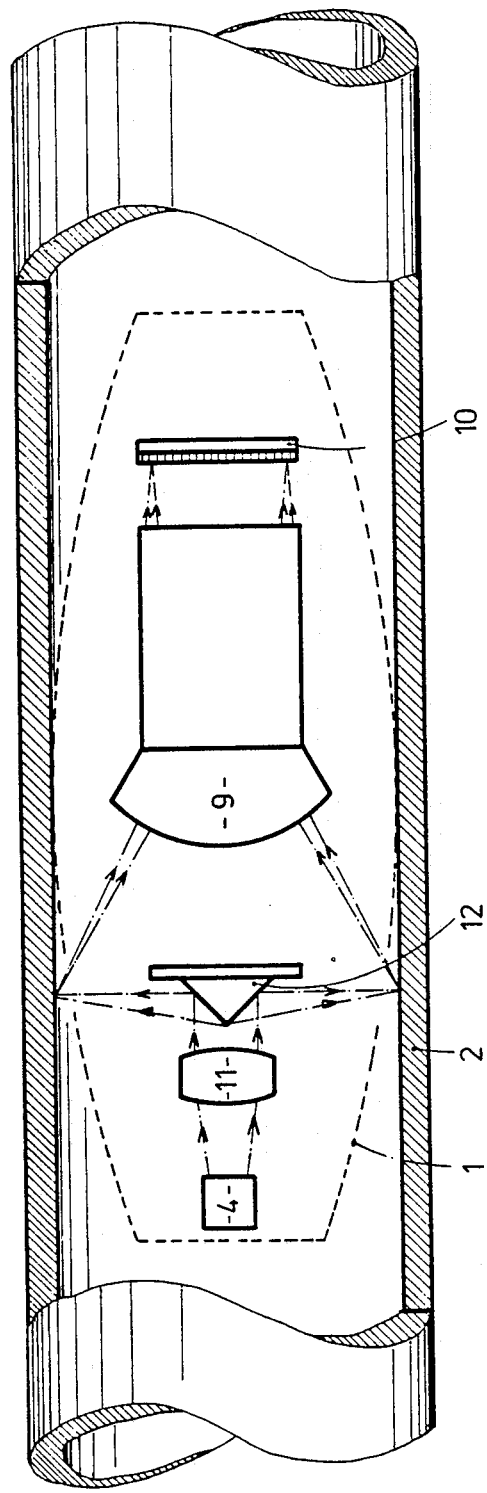
FIG. 2 shows diagrammatically the operating principles of the probe of a second embodiment.
Figure 3:
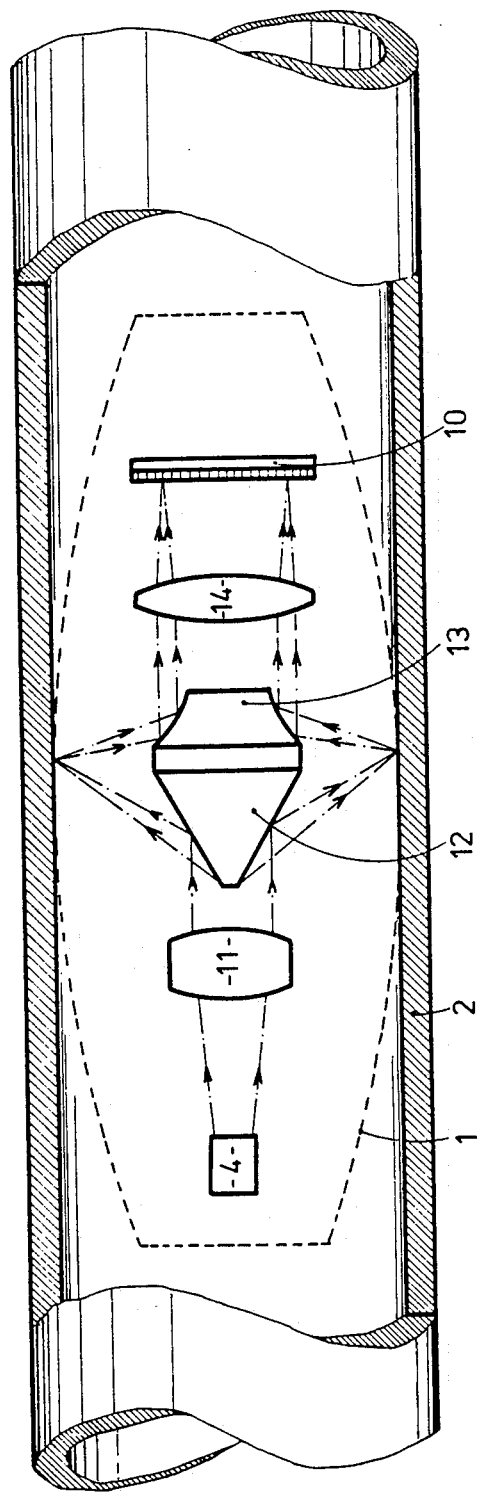
FIG. 3 shows diagrammatically the operating principles of the probe of a third embodiment.

In the embodiments of FIGS. 1 to 3 a probe 1 is shown in dotted lines, arranged to move longitudinally inside a tube 2.

In the case of the FIG. 1 embodiment the inner wall of the tube 2 is illuminated by a laser beam 3 emitted longitudinally from a source 4 and reflected by two prisms 5 centrally onto a mirror 7 which reflects it onto the inner wall of the tube 2. The mirror 7 is driven by a motor 8 so that is rotates about the longitudinal axis of the Probe 1 to cause the laser beam to sweep the inner wall of the tube 2 along a line corresponding to the intersection of the wall with a cross-sectional plane.

The inner wall of the tube 2 thus illuminated behaves as an emitting object, and an image thereof is formed, by means of a wide angle lens 9, in a viewing plane in which a matrix opto-electronic sensor 10 is situated.

The image formed on the sensor 10 consists of a line which corresponds to the inner profile of the tube 2. Any variation of the profile from the typical profile of the inner wall of the tube is translated by a deviation of the image line from a predetermined theoretical line corresponding to the typical profile.

Analysis of the image obtained on the opto-electronic sensor 10 therefore makes it possible to know the actual inner profile of the tube 2. The sensitivity of the device thus depends on the resolving power of the opto-electronic sensor 10. If one has N points of measurement distributed over a diameter of the image plane, the resolution on the measurement of the diameter D of the tube will be equal to $$\frac{D}{N}.$$

Since the inner wall is illuminated by means of a beam of light swept by the rotating mirror 7, it can be appreciated that the image of the re-emitted light could be formed using a second rotating mirror, driven synchronously with the first, to produce a correspondingly swept point image on the opto-electronic sensor. In such a case the opto-electronic sensor could be of the linear type, arranged to rotate synchronously with the mirrors. The, mechanical complexity involved would be compensated for by an improved resolving power, the latter being better for a linear opto-electronic sensor rather than for a matrix opto-electronic sensor.

In the arrangement shown in FIG. 2, the beam of coherent light emitted from a laser light source 4 is converted, by means of an optical system 11, into a relatively wide beam which impinges on a conical reflector 12 disposed with its axis coincident with the longitudinal axis of the probe 1. The optical system 11 is arranged such that the beam of light reflected from the conical reflector 12 converges onto the inner wall of the tube 2 so that the wall is illuminated along a line which corresponds to the intersection of the wall with a radial cross-section of the tube. As before, an image of this line is formed, with the aid of a wide angle lens 9, on a matrix opto-electronic sensor 10.

In the arrangement shown in FIG. 3, the method of illuminating the inner wall of the tube 2 is identical with that used in the probe illustrated in FIG. 2. In this case, however, the image of the illuminated line is formed on an opto-electronic sensor 10 by means of a second conical mirror 13 and an optical focussing system 14. The conical reflecting mirror 13 preferably has a nonlinearly varying section so as to produce a non-linear magnification which makes it possible to improve the resolution of the measurement, with only the periphery of the image plane supplying relevant information. This non-linear magnification ratio thus permits the accuracy of measurement to be improved for a given two-dimensional observation system.

The constraints imposed by the diameter available inside the heat exchanger tubes of steam generators leads to various proposals concerning the miniaturization of the probe.

In the arrangement shown in FIG. 4, the probe 1 is split into two interconnected parts 1A and 1B. The first part 1A comprises, for example, the whole of the device depicted in FIG. 3, with the exception of the opto-electronic sensor 10. The latter component and the hybrid operating circuit 15 associated with it are placed in the second part 1B. The connection between the two parts 1A and 1B is effected by means of an optical fiber cable 16 having its input end 17 arranged to receive the image formed by the optical system 14 in part 1A. The image thus transmitted by the optical fiber cable 16 to its output end 18 in the part 1B is projected onto the opto-electronic sensor 10 by means of a lens 19. The signal produced by the hybrid circuit 15 is transmitted by a cable 20 for analysis outside the tube 2.

In a modification of this construction the sensor 10 may be in direct contact with the output end 18 of the optical fibre cable 16, thus dispensing with the need for the lens 19.

The arrangement which has just been described with reference to FIG. 4 permits having a relatively substantial volume for the electronic Portion, but it requires an optical fibre cable 16 of adequate resolving power, flexibility and strength. An alternative arrangement would be to place the opto-electronic sensor 10 in the probe part 1A (as in the FIG. 3 embodiment), and to house the processing electronics in the part 1B with a short length wire connection between the two parts. Although this arrangement has the advantage of providing an even greater space for the electronic portion, it requires particular attention to the quality of the high frequency connections.

In the arrangement shown in FIG. 5, the probe 1 comprises a single housing in which all of the optical and opto-electronic components, as well as a minimal Part 21 of the electronic circuit, are located. The remainder of the electronics is situated outside the tube.

The sectional view shown in FIG. 6 illustrates how the light beam can scan or illuminate almost the entire circumference of the inner wall of the tube. Ports which occupy almost the entire periphery of the probe are provided in its wall, the end portions of the probe being joined together by struts 22 of minimum thickness sufficient only to ensure the mechanical rigidity of the probe as a whole. It will also be understood that the two ends of the probe could be joined together by a transparent ring possessing suitable optical qualities.

We claim:

1. Apparatus for optically checking the profile of the inner wall of a tube or bore which comprises:
a probe positioned within and movable longitudinally within said tube or bore and connectable to a power and analysis system disposed outside said tube or bore, said probe including,
alight source,
projecting means for causing light from said light source to illuminate said inner wall of said tube or bore along a line corresponding to the intersection of said inner wall with a cross-sectional plane,
a photo-sensitive sensor, and
imaging means for receiving light re-emitted from said illuminated line on said inner wall and forming an image of said line on said photo-sensitive sensor, whereby deviations of said image on said sensor from a predetermined theoretical image of said inner wall represent variations in the profile of said inner wall.

2. Apparatus according to claim 1, wherein said photo-sensitive sensor comprises an opto-electronic sensor.

3. Apparatus according to claim 1, wherein said photo-sensitive sensor comprises a photographic film type sensor having a photo-sensitive surface.

4. Apparatus according to claim 1, wherein said light source is adapted to emit a fine beam, and said projecting means comprises a mirror mounted for rotation about the longitudinal axis of said probe and a motor for rotating said mirror to cause said fine beam to scan said line to be illuminated by said beam.

5. Apparatus according to claim 1, wherein said light source is adapted to emit a beam, and said projecting means comprises a conical mirror mounted to reflect said beam so as to illuminate the whole of said line on said inner wall simultaneously.

6. Apparatus according to claim 4, wherein said imaging means comprises a mirror and means for rotating said mirror synchronously with said mirror of said projecting means to reflect light received from said illuminated line onto said photo-sensitive sensor.

7. Apparatus according to claim 4, wherein said imaging means comprises a wide angle optical lens.

8. Apparatus according to claim 5, wherein said imaging means comprises a wide angle optical lens.

9. Apparatus according to claim 5, wherein said imaging means comprises a conical mirror.

10. Apparatus according to claim 9, wherein said conical mirror of said imaging means has a non-linearly varying section.

11. Apparatus according to claim 1, wherein said probe comprises first and second parts, said first part including said light source, said projecting means, and at least a portion of said imaging means, and said second part including said photo-sensitive sensor, said probe further comprisng means interconnecting said first and second parts for conducting light from said imaging means portion in said first part to said second part for delivery to said photo-sensitive sensor.

* * * * *